United States Patent [19]
Rando et al.

[11] Patent Number: 4,776,672
[45] Date of Patent: Oct. 11, 1988

[54] MULTI-PANED POLYGONAL LIGHTHOUSE ASSEMBLY WITH IMPROVED CORNER CONFIGURATION

[75] Inventors: Joseph F. Rando, Los Altos Hills, Calif.; James N. Hayes, Urbana, Ohio

[73] Assignee: Spectra-Physics Inc., San Jose, Calif.

[21] Appl. No.: 121,090

[22] Filed: Nov. 16, 1987

[51] Int. Cl.[4] .................... G02B 27/00; G01C 9/02
[52] U.S. Cl. .................................. 350/321; 356/248; 356/149; 350/99
[58] Field of Search .............. 350/321, 319, 359, 169, 350/170, 99; 356/149, 150, 248, 368, 387; 362/35; 340/981

[56] References Cited

U.S. PATENT DOCUMENTS

| | | | |
|---|---|---|---|
| 4,062,634 | 12/1977 | Rando et al. | 356/248 |
| 4,183,667 | 1/1980 | Denton | 356/149 |
| 4,393,597 | 7/1983 | Picard et al. | 356/149 |

*Primary Examiner*—John K. Corbin
*Assistant Examiner*—Loha Ben
*Attorney, Agent, or Firm*—Killworth, Gottman, Hagan & Schaeff

[57] ABSTRACT

A multiple pane lighthouse assembly in a reference laser beam projecting apparatus includes a plurality of transparent panes disposed in an arrangement that defines a transparent window structure which permits transmission of laser light therethrough and has a generally polygonal cross-sectional shape. The window structure has spaced corners formed by pairs of adjacent ones of the opposite side edge portions of the panes. The side edge portions of the panes in each pair are offset relative to one another in forming a respective corner. The offset position of the side edge portions of each pair in forming a respective corner exposes only an interior edge on one of the adjacent side edge portions to laser light being transmitted through the window structure. The path of laser light through the adjacent side edge portions forming the corner is thereby affected only by one interior edge on the respective one of the adjacent side edge portions of the panels at each corner. The offset relationship also provides for the placement of adhesive to bond the side edge portions together in the shadow area of laser light being transmitted through the corner.

20 Claims, 3 Drawing Sheets

MULTI-PANED POLYGONAL LIGHTHOUSE ASSEMBLY WITH IMPROVED CORNER CONFIGURATION

BACKGROUND OF THE INVENTION

The present invention generally relates to apparatus for providing a reference laser beam and, more particularly to a polygonal lighthouse assembly for use in such apparatus, the lighthouse assembly having transparent panes assembled together in an arrangement which provides an improved corner configuration.

Laser beam systems have been employed in numerous surveying and construction applications. In one such system disclosed in U.S. Pat. No. 4,062,634, which issued Dec. 13, 1977 to Rando et al and is assigned to the assignee of the present invention, a laser beam projecting apparatus provides a rotating laser beam which establishes a reference plane. Typically, the rotating laser beam is used to provide a continuous, visible plane of light that creates a constant horizontal benchmark of elevation over an entire work area. Also, the system employs one or more laser beam detectors placed at considerable distances from the projecting apparatus for intercepting the rotating laser beam and determining elevation at selected points throughout the work area.

In the laser beam projecting apparatus, the generally horizontal rotating reference laser beam is produced by projecting the beam generally upward and then deflecting it ninety degrees within a pentaprism or penta-mirror assembly. The pentaprism assembly is rotated about a vertical axis within the projecting apparatus to cause the horizontal beam to rotate and define the horizontal plane.

In another type of laser beam projecting apparatus, a stationary plane of reference laser light is produced by projecting the beam generally upward and then deflecting the beam laterally by means of an inverted conical reflector. The conical reflector is aligned with its apex in the center of the beam and its axis aligned with the beam. To adapt either type of reference laser beam projecting apparatus for use in surveying and construction applications under a variety of field conditions, the projecting apparatus is provided with a waterproof housing having an upper transparent lighthouse assembly within which the pentaprism assembly rotates or the conical reflector is positioned and through which the laser beam is projected. The lighthouse assembly typically includes four upstanding flat transparent panes of glass of high optical quality which are joined together to form a polygonal structure with generally vertical corner junctures at their side edge portion surfaces. Four posts are threadably mounted between a top casting of the housing above the panes and upper rim of the housing below the panes for applying sufficient axial forces to pull them together and lock the panes into appropriate seats. The four posts are aligned radially outwardly of the generally vertical corner junctures formed between the panes, while the panes have forty-five degree bevel side edge surfaces which interface to form the corner junctures and are sealably mounted together by a suitable adhesive.

For the most part, the overall performance of the above-described types of reference laser beam projecting apparatus has met and even surpassed expectations. However, difficulties have been experienced with regard to the ability to construct and assemble lighthouse pane corner junctures to the standard of precision necessary and desired to reliably avoid degradation of beam continuity as it passes through the corner junctures.

It is, therefore, seen that a need exists for an improved lighthouse assembly construction which will eliminate difficulties encountered at the corner junctures of the panes in prior art lighthouse assembly constructions.

SUMMARY OF THE INVENTION

The present invention provides a lighthouse assembly having multiple panes with improved corner constructions designed to satisfy the aforementioned needs. Particularly, the lighthouse assembly of the present invention includes a plurality of transparent panes disposable in an arrangement that defines a transparent window structure which permits transmission of laser light therethrough and has a generally polygonal cross-sectional shape. The lighthouse assembly also includes means engaging the window structure for maintaining the panes in the arrangement. The window structure has spaced corners formed by pairs of adjacent ones of the opposite side edge portions of the panes. The side edge portions of the panes of each pair thereof are offset relative to one another in forming a respective corner.

Further, different offset corner configurations are provided. In each offset corner configuration, the opposite side edge portion of each pane has an interior edge thereon. The offset relationship of the side edge portions of each pair in forming a respective corner exposes only the interior edge on one of the adjacent side edge portions to laser light being transmitted outwardly through the window structure. The path of laser light through the adjacent side edge portions forming the corner is thereby affected only by the exposed interior edge on the respective one of the adjacent side edge portions of the panes at each corner.

The interior edge on the other of the offset adjacent side edge portions is disposed in a shadow region of laser light being transmitted through the adjacent side edge portion and thus is unexposed to laser light. The exposed and unexposed edges of the adjacent side edge portions define a space extending generally between them which is disposed in the shadow region. A quantity of adhesive is contained in the space which bonds the adjacent side edge portions of the panes together at the corner without affecting the path of laser light being transmitted through the corner.

In both of the offset corner configurations, the one side edge portion has a beveled configuration forming an angle with the path of laser light being transmitted through the corner which defines the shadow region between the one and the other of the adjacent side edge portions at the corner. In one corner configuration, the other adjacent side edge portion has a beveled configuration also to interface the adjacent side edge portions with one another within shadow region defined therebetween. In the other corner configuration, the other adjacent side edge portion has a nonbeveled configuration to interface the adjacent side edge portions with one another within the shadow region. Specifically, the other adjacent side edge portion has a generally squared-off configuration.

Accordingly, it is an object of the present invention to provide a lighthouse assembly having multiple panes with improved corner constructions which increase stiffness of the assembly and reduce loss of beam continuity; to provide a lighthouse assembly having multiple panes with improved corner constructions which are applicable to any polygonal lighthouse configuration; to provide a lighthouse assembly having multiple panes with improved corner constructions which do not require that the panes be vertically positioned; to provide a lighthouse assembly having multiple panes with improved corner constructions brought about by offsetting adjacent lighthouse panes so as to reduce to one edge the number of pane edges affecting the limiting ray path; to provide a lighthouse assembly having multiple panes with improved corner constructions which reduce the degree of precision required to assemble the panes together to form the corners; and to provide a lighthouse assembly having multiple panes with improved corner constructions that allow for increased areas for bonding the panes together.

Other objects and advantages of the invention will be apparent from the following description, the accompanying drawings and the appended claims.

DETAILED DESCRIPTION OF THE PREFERRED EMBODIMENT

Figure 1:
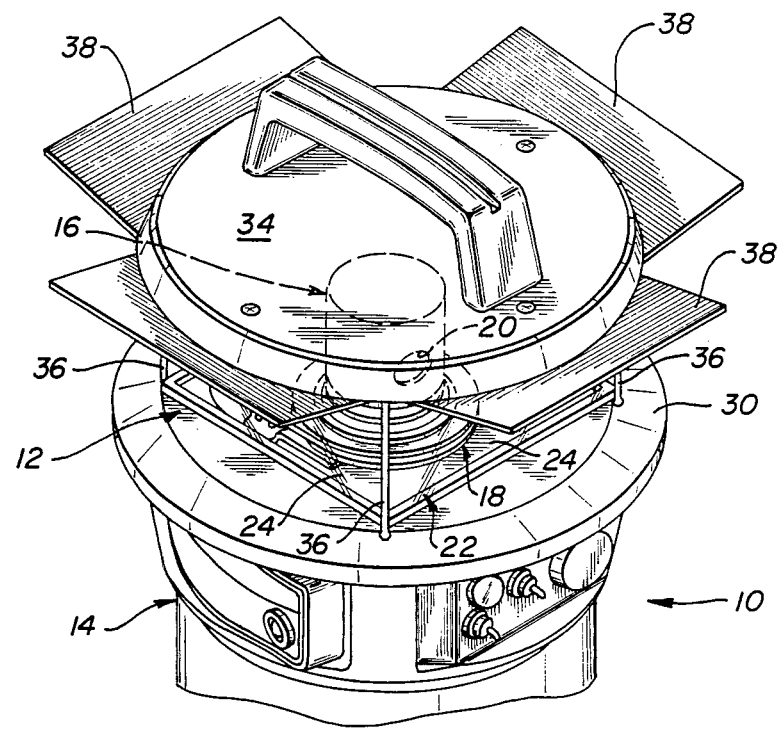
FIG. 1 is a perspective view of the upper portion of a prior art reference laser beam projecting apparatus.
Figure 2:
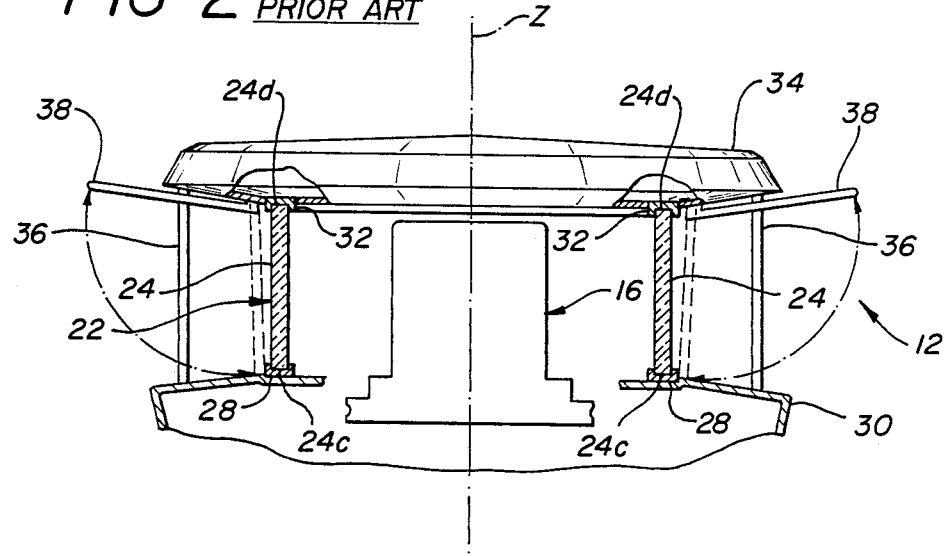
FIG. 2 is a fragmentary side elevational view, partly in section, of a prior art multiple pane lighthouse assembly mounted at the upper end of the housing of the apparatus of FIG. 1.

Reference is made to FIGS. 1 and 2 of the drawings which illustrate an upper portion of a prior art reference laser beam projecting apparatus, generally designated 10, having a prior art multiple pane lighthouse assembly 12 mounted thereon. The apparatus 10 is generally similar to that disclosed in the aforementioned U.S. Pat. No. 4,062,634 to Rando et al, which is incorporated by reference herein. The basic components and arrangement of the apparatus 10 will be described herein to the extent necessary to facilitate an appreciation of the improvements provided by the present invention. A more detailed understanding of the apparatus 10 can be gained by reference to the above-cited U.S. patent.

As constructed heretofore, the reference laser beam projecting apparatus 10 includes a hollow cylindrical housing 14 which provides a sealed, water-tight enclosure for the internal components of the apparatus which basically include a laser beam source (not shown) and a precision arrangement of optical devices (not shown), such as lenses and mirrors. The laser beam source, which may for example be a gas discharge laser or a laser diode, and the arrangement of lenses and mirrors are mounted in a hollow chassis (not shown). When the housing 14 is placed in an upright position as seen in FIG. 1, the arrangement of lenses and mirrors route the reference laser beam (not shown) through an open end of the chassis along a vertical axis Z into a pentaprism reflecting head, generally indicated at 16.

The laser beam reflecting head 16 comprises a pentaprism assembly (not shown) and a cylindrical rotator or holder 18 which supports the pentaprism assembly and is rotated about the vertical axis Z by means of a motor (not shown) mounted the chassis. The pentaprism assembly has a pair of reflecting surfaces (not shown) which are accurately aligned for diverting the beam from the vertical axis Z to a direction generally perpendicular thereto, outwardly through a window 20 defined in the holder 18, and through a multi-sided transparent window 22 defined in the lighthouse assembly 12. Thus, as the pentaprism assembly rotates with the reflecting head holder 18 about the vertical axis Z, the diverted beam sweeps a horizontal reference plane projecting orthogonal to the vertical axis.

The lighthouse assembly 12 located in the upper end of the housing 14 of the projecting apparatus 10 provides a water-tight enclosure for the rotating pentaprism reflecting head 16. Also, at the same time, the lighthouse assembly 12 provides the transparent window 22 for transmitting the diverted beam which sweeps the reference plane.

Figure 3A:
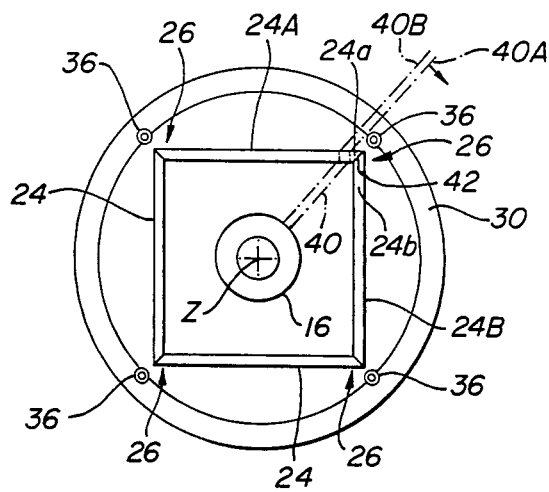
FIG. 3A is a diagrammatic top plan view of the prior art lighthouse assembly of FIG. 2, illustrating one operative sequence thereof.
Figure 3B:
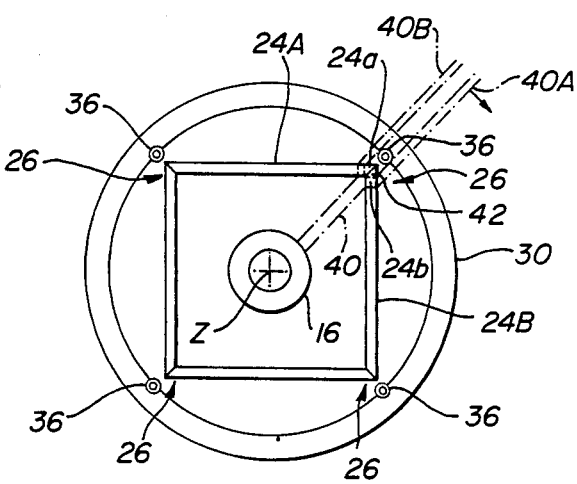
FIG. 3B is view similar to that of FIG. 3A, illustrating another operative sequence of the prior art lighthouse assembly.
Figure 3C:
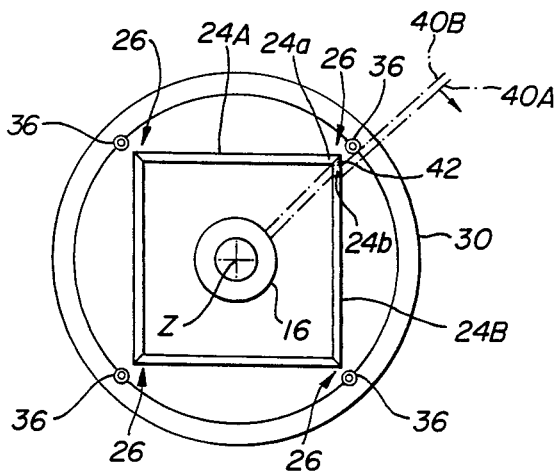
FIG. 3C is another view similar to that of FIG. 3B, illustrating yet another operative sequence of the prior art lighthouse assembly.

In the apparatus disclosed in the Rando et al patent, the lighthouse assembly 12 includes a plurality of generally identical, upstanding, transparent panes 24 which are joined together, as shown in FIGS. 3A-3C, at their generally vertical, opposite side edge portions 24a and 24b so as to form a structure having a polygonal cross-sectional configuration and corner junctures 26. In the illustrated embodiment, four such panes 24 are provided to form a structure being square in cross-section and having right-angle corner junctures. Preferably, each of the panes 24 is composed of a flat optical quality glass which has on its inner and outer surfaces a suitable anti-reflective coating.

At their generally horizontal, lower edge portions 24c, the panes 24 are sealably mounted by gaskets 28 within recessed seats formed in an upper rim 30 of the housing 14, and the upper edge portions 24d of the panes 24 are sealably mounted by gaskets 32 within recessed seats formed within a top casting 34 of the apparatus 10. Four elongated posts 36, threadably mounted between the top casting 34 and upper rim 30 of the housing 14, pull the top casting 34 and the housing 14 together, and lock the panes 24 into their seats.

Four shutters 38 are hingedly mounted at their upper ends to the top casting 34 across the upper edge portions 24d of the respective panes 24. As seen in FIG. 2, the shutters 38 are individually manually pivoted between an upper position for uncovering the panes 24, and a lower position for covering the panes.

As shown in FIGS. 3A-3C, the four posts 36 are aligned radially outwardly of the corner junctures 26 between the panes 24. The opposite side edge portions 24a, 24b of the panes 24 which form the corner junctures 26 are in the form of forty-five degree bevel surfaces which interface with one another and are secured together by a suitable adhesive. The position and configuration of the panes 24 at their corner junctures 26 with respect to the posts 36 generally provides an arrangement which allows sweeping of the horizontally-diverted beam past each post position throughout a full three hundred sixty degrees without loss of impingement, i.e., a blind spot, upon the remote target or beam detector.

The diagrams of FIGS. 3A–3C illustrate the path of a beam 40 as it sweeps clockwise, as viewed from above, past the position of one of the corner posts 36 at the interface 42 forming one of the corner junctures 26. In this explanation, it will be assumed that the apparatus 10 is set up to project a horizontal plane. In FIG. 3A, the beam 40 is at a position just prior to intersecting the interface 42. The beam 40 is refracted outwardly through an angle, in a horizontal plane, at the inner surface of pane 24A, and then is refracted back at an equal angle as it emerges from the outer surface of the pane. The leading portion 40A of the beam 40 which would otherwise be blocked by the post 36 is instead refracted in a path which avoids the post so that the full beam 40 can impinge upon the remote target.

FIG. 3B illustrates beam 40 is radial register with the post 36 and pane interface 42. In this case the leading one half portion 40A of the beam 40 is refracted forwardly through a horizontal angle at the inner surface of pane 24B and then is refracted back through an equal angle as it emerges from the outer surface so that this beam portion 40A is refracted through a path which avoids the post and thereby can fully impinge upon the target. In the same beam position the trailing beam portion 40B is refracted back through a horizontal angle at the inner surface of pane 24A and then forward at an equal angle as it emerges from the outer surface. Thus, this trailing portion 40B also avoids the post 36 and can fully impinge upon the target.

Finally, FIG. 3C illustrates a further beam position immediately after the pane interface 42 whereby the full beam 40 is refracted through pane 24B to completely avoid the post 36. It will be realized that, when the beam 40 moves across the interface 42 of the panes 24A and 24B within the lighthouse assembly 12, such beam will be observed at the target as a split beam, the leading portion 40A of which progressively enlarges in size as it sweeps forward while the trailing portion 40B progressively decreases in size. However, the total area of beam impingement is substantially the same as if the beam 40 were not sweeping by the post 36. Since the post 36 is located in a "shadow" or "void" area between the split beam portions 40A and 40B, it does not affect the beam 40.

Figure 4:
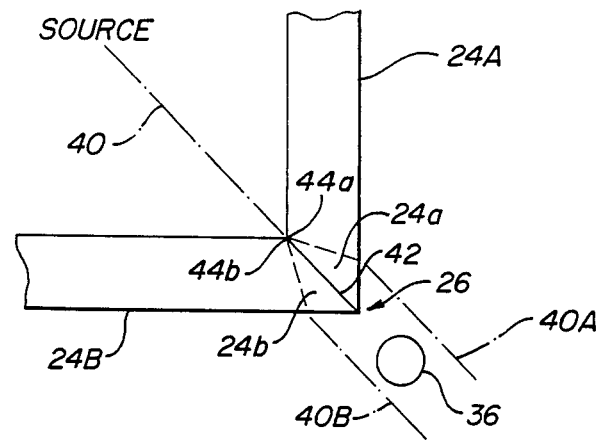
FIG. 4 is an enlarged fragmentary diagrammatic view of the prior art lighthouse assembly as seen in FIG. 3A, illustrating the prior art edge configuration and arrangement of the panes which form a corner juncture thereof.

FIG. 4 illustrates, on an enlarged scale, the FIG. 3B position of the beam 40 at which it is in radial register with the post 36 and the pane interface 42, and thus split by opposite refraction of leading and trailing portions 40A and 40B thereof. It can be seen that the two forty-five degree mitered surfaces on the adjacent side edge portions 24a and 24b of the respective adjacent panes 24A and 24B have two inner edges 44a and 44b which affect the beam ray path.

For transmission of truly parallel exiting rays in the split leading and trailing beam portions 40A and 40B, both inner pane edges 44a and 44b must be perfectly sharp and the surfaces of the side edge portions 24a and 24b must be perfectly constructed and interfaced together. However, if either of the inner pane edges 44a and 44b are not perfectly sharp or there is adhesive in the mitered corner which prevents the edge portions surfaces from interfacing properly together, refraction of the beam portions 40A, 40B will occur at the edges which causes divergence of the beam.

Such divergence increases the width of the shadow or void area with increasing distance from the laser beam source. This adversely affects the continuity of the beam at the corner junctures 26 and thus the ability to detect the split beam at a remote detector. The difficulty experienced in constructing and assembling a precision mitered corner juncture 26 at the side edge portions 24a and 24b of two lighthouse panes 24 that will avoid or reduce the aforementioned problems and produce truly parallel beam rays can be readily appreciated.

Figure 5:
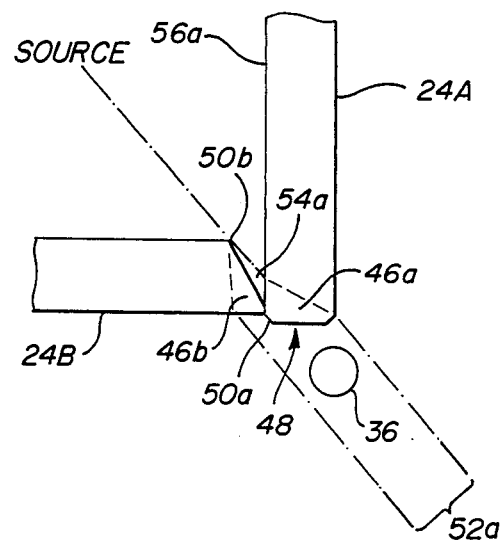
FIG. 5 is a view similar to that of FIG. 4, but showing an edge configuration and arrangement of the panes forming a first embodiment of an offset corner in accordance with the present invention.
Figure 6:
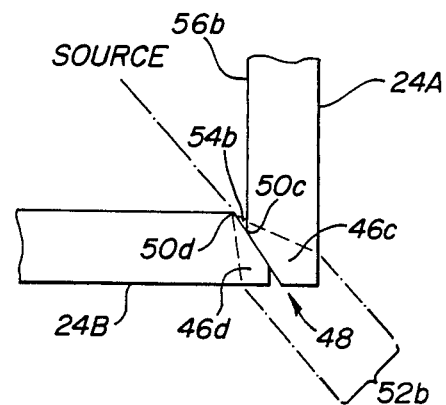
FIG. 6 is another view similar to that of FIG. 4, but showing another edge configuration and arrangement of the panes forming a second embodiment of an offset corner in accordance with the present invention.

Referring now to FIGS. 5 and 6, there is shown the improvements of the present invention which advantageously can be incorporated in the prior art lighthouse assembly 12 which is described above. The improvements relate to modifications of the prior art corner junctures 26 between the panes 24 of the lighthouse assembly 12 to provide an improved corner configuration producing increased stiffness of the assembly without loss of beam continuity. The plurality of transparent panes 24 of the lighthouse assembly 12 still remain disposed in an arrangement that defines the transparent window structure 22, permitting transmission of laser light therethrough and having a generally polygonal cross-sectional shape. However, in the present invention the panes 24 have different configurations at their respective side edge portions 46. The window structure 22 has spaced corners 48 (only one seen in each of FIGS. 5 and 6) formed by pairs of adjacent ones of the opposite side edge portions 46 of the panes 24. In the improved corner configurations, the adjacent side edge portions 46 of each pair forming a respective corner 48 are offset relative to one another.

In comparison of FIG. 5 with FIG. 6, it is seen that different offset corner configurations are provided. In each offset corner configuration, the opposite side edge portions 46 of each pane 24 have interior edges 50 thereon. In FIG. 5, the adjacent side edge portions 46a and 46b of panes 24A and 24B have respective interior edges 50a and 50b, whereas in FIG. 6, the adjacent edge portions 46c and 46d of panes 24A and 2BB have respective interior edges 50c and 50d. However, unlike in the case of inner edges 44a and 44b of the prior art corner juncture 26 in FIG. 4, wherein both edges 44a and 44b were exposed to the laser beam, in the offset corner configurations of the present invention only the edge 50b on the one side edge portion 46b in FIG. 5, and the edge 50d on the one side edge portion 46d in FIG. 6, are exposed to the laser beam. Thus, the path is of laser light through the adjacent side edge portions 46a and 46b in FIG. 5, and 46c and 46d in FIG. 6 are thereby affected only by one exposed interior edge.

The interior edges 50a in FIG. 5 and 50c in FIG. 6 on the other of the respective offset adjacent side edge portions 46a and 46c are disposed in shadow or void regions labeled 52a in FIG. 5 and 52b in FIG. 6. The exposed and unexposed edges, 50b and 50a in FIG. 5 and 50d and 50c in FIG. 6, of the adjacent side edge portions, 46b and 46a in FIG. 5 and 46d and 46c in FIG. 6, define a space 54a in FIG. 5 and 54b in FIG. 6 extending generally between the exposed and unexposed edges. This space is disposed in the shadow region. If desired, a quantity of suitable adhesive can be applied in the space 54a or 54b to bonds the adjacent side edge portions of the panes together without affecting the path of laser light. In both of the improved offset corner configurations, the one side edge portion 46b in FIG. 5 and 46d in FIG. 6 has a beveled configuration forming an angle with the path of laser light and defining the space 54a in FIG. 5 and 54b in FIG. 6 between the side edge portion and an inner flat surface 56a in FIG. 5 and 56b in FIG. 6. Alternatively, or in addition, a layer of adhesive may be provided between the panes 24A and 24B since this interface is entirely within the shadow regions 52a and 52b.

In the offset corner configuration of FIG. 5, the adjacent side edge portion 46a has a nonbeveled configuration which interfaces with adjacent beveled side edge portion 46b within the shadow region 52a. Specifically, the side edge portion 46a has a generally squared-off configuraion. In the other offset corner configuration of FIG. 6, the adjacent side edge portion 46c has another beveled configuration which interfaces with the adjacent beveled side edge portion 46d within shadow region 52b defined therebetween.

Thus, it can be seen that the offset configuration of corner 48 reduces the number of critical pane edges affecting the light ray path to one. Also, the degree of precision required in assembling the corners 48 is reduced. Furthermore, it is readily apparent that the lighthouse assembly having the improved offset corner configurations is not limited to which the panes 24 are disposed in vertical orientations panes can be tipped away from the vertical. If desired, the panes may all be tipped away from vertical, providing the angles of the corner surfaces are altered to conform to this geometry. It will be further appreciated that while the invention has been described in terms of a laser beam projector which provides a rotating beam, the lighthouse assembly of the present invention is equally suited for use in a projector which produces a stationary plane of light. Additionally, it will be appreciated that the present invention may be incorporated into lighthouse assemblies having three, five, or other numbers of panes of glass arranged in a polygonal configuration.

Having thus described the improved lighthouse assembly construction of the present invention in detail and by reference to preferred embodiments thereof, it will be apparent that certain modifications and variations are possible without departing from the scope of the invention defined in the appended claims.

What is claimed is:

1. A lighthouse assembly for a reference laser beam projecting apparatus, comprising:
a plurality of transparent panes having opposite side edge portions, said panes being disposed in a generally polygonal configuration to provide a transparent window structure which permits transmission of laser light therethrough, said window structure having spaced corners formed by pairs of adjacent ones of said opposite side edge portions of said panes, said opposite side edge portions of each pair being offset relative to one another in forming each corner whereby the path of laser light being transmitted outward through said adjacent side edge portions forming said each corner will be affected only by one of said respective adjacent side edge portions of said panes at said corner.

2. The lighthouse assembly of claim 1 in which each of said offset opposite side edge portions of said transparent panes has an interior edge, said opposite side edge portions of each pair being offset relative to one another in forming said corner so as to expose only said interior edge on one of said adjacent side edge portions to laser light being transmitted through said window structure.

3. The lighthouse assembly of claim 1 in which said interior edge on the other of said offset adjacent side edge portions is disposed in a shadow region of laser light being transmitted through said adjacent side edge portions forming said each corner and thus unexposed to the laser light.

4. The lighthouse assembly of claim 3 in which said exposed and unexposed edges of said adjacent side edge portions define a space extending therebetween which is disposed in said shadow region of laser light being transmitted through said adjacent side edge portions.

5. The lighthouse assembly of claim 4 in which a quantity of adhesive is contained in said space which bonds said adjacent side edge portions of said panes together at said corner.

6. The lighthouse assembly of claim 1 in which the path of laser light being transmitted through said offset adjacent side edge portions will be affected only by said exposed one of said interior edges on said respective adjacent side edge portions of said panels at said corner.

7. The lighthouse assembly of claim 1 in which said one of said adjacent side edge portions has a beveled configuration which forms an angle with the path of laser light being transmitted through said corner such that a shadow region is defined between said one and the other of said adjacent side edge portions at said corner.

8. The lighthouse assembly of claim 7 in which a quantity of adhesive is contained in said shadow region to bond said adjacent side edge portions together at said corner.

9. The lighthouse assembly of claim 7 in which the other of said adjacent side edge portions has a beveled configuration to interface said one with said other of said adjacent slde edge portions within said shadow region defined therebetween.

10. The lighthouse assembly of claim 7 in which the other of said adjacent side edge portions has a nonbeveled configuration to interface said one with said other of said adjacent side edge portions within said shadow region defined therebetween.

11. The lighthouse assembly of claim 10 in which the other of said adjacent side edge portions has a generally squared-off configuration.

12. A lighthouse assembly for a reference laser beam projecting apparatus, comprising:
a plurality of transparent panes having opposite side edge portions with an interior edge on each side edge portion, said panes being disposable in a polygonal arrangement that defines a transparent window structure permitting transmission of laser light therethrough, said window structure having spaced corners formed by pairs of adjacent ones of said opposite side edge portions, said opposite side edge portions of each pair being offset relative to one another in forming each corner so as to expose only said interior edge on one of said adjacent side edge portions to laser light being transmitted outward through said window structure, whereby the path of laser light through said adjacent side edge portions forming each corner will be affected only by the exposed one of said interior edges at said corner.

13. The lighthouse assembly of claim 12 in which said interior edge on the other of said offset adjacent side edge portions is disposed in a shadow region of laser light being transmitted through said adjacent side edge portions forming said each corner and thus unexposed to the laser light.

14. The lighthouse assembly of claim 13 in which said exposed and unexposed edges of said adjacent side edge portions define a space extending therebetween which is disposed in said shadow region of laser light being transmitted through said adjacent side edge portions.

15. The lighthouse assembly of claim 14 in which a quantity of adhesive is contained in said space which bonds said adjacent side edge portions of said panes together at said corner.

16. The lighthouse assembly of claim 12 in which said one of said adjacent side edge portions has a beveled configuration which forms an angle with the path of laser light being transmitted through said corner such that a shadow region is defined between said one and the other of said adjacent side edge portions at said corner.

17. The lighthouse assembly of claim 16 in which a quantity of adhesive is contained in said shadow region which bonds said adjacent side edge portions together at said corner.

18. The lighthouse assembly of claim 17 in which the other of said adjacent side edge portions has a beveled configuration to interface said one with said other of said adjacent side edge portions within said shadow region defined therebetween.

19. The lighthouse assembly of claim 17 in which the other of said adjacent side edge portions has a nonbeveled configuration to interface said one with said other of said adjacent side edge portions within said shadow region defined therebetween.

20. The lighthouse assembly of claim 19 in which the other of said adjacent side edge portions has a generally squared-off configuration.

* * * * *